United States Patent
Vier et al.

(10) Patent No.: US 9,795,213 B1
(45) Date of Patent: Oct. 24, 2017

(54) DETACHABLE EASEL WITH KEYBOARD TRAY AND WIRELESS PAIRING PROTOCOL

(71) Applicant: Xplore Technologies Corp., Austin, TX (US)

(72) Inventors: Bradford Edward Vier, Austin, TX (US); Larry Stone, Austin, TX (US)

(73) Assignee: Xplore Technologies Corp., Austin, TX (US)

( * ) Notice: Subject to any disclaimer, the term of this patent is extended or adjusted under 35 U.S.C. 154(b) by 331 days.

(21) Appl. No.: 14/667,061

(22) Filed: Mar. 24, 2015

Related U.S. Application Data

(60) Provisional application No. 61/969,616, filed on Mar. 24, 2014.

(51) Int. Cl.
| | |
|---|---|
| G09G 5/00 | (2006.01) |
| A47B 23/00 | (2006.01) |
| G06F 3/023 | (2006.01) |
| F16B 1/00 | (2006.01) |
| F16M 11/20 | (2006.01) |

(52) U.S. Cl.
CPC .............. *A47B 23/001* (2013.01); *F16B 1/00* (2013.01); *F16M 11/2021* (2013.01); *G06F 3/0231* (2013.01); *F16B 2001/0035* (2013.01)

(58) Field of Classification Search
CPC .... G06F 1/1681; G06F 1/1616; G06F 1/1618; G06F 1/1679; G06F 1/1683; G06F 1/162; G06F 1/1624; G06F 1/1662; G06F 1/1677; G06F 1/1666; G06F 2200/1614; G06F 3/0202; G06F 3/0213; G06F 3/0216

USPC .... 361/679.02, 679.27, 679.28, 691, 679.11, 361/679.12, 679.13, 679.15, 679.16, 361/679.17, 679.2
See application file for complete search history.

(56) References Cited

U.S. PATENT DOCUMENTS

| | | | |
|---|---|---|---|
| 6,006,243 A * | 12/1999 | Karidis | G06F 1/1616 361/679.27 |
| 7,259,750 B2 | 8/2007 | Ghosh et al. | |
| 7,911,784 B2 * | 3/2011 | Jones | G06F 1/1632 248/346.03 |

(Continued)

FOREIGN PATENT DOCUMENTS

WO  2012/106215  8/2012

*Primary Examiner* — Duc Dinh
(74) *Attorney, Agent, or Firm* — Egan Peterman Enders Huston

(57) ABSTRACT

According to one embodiment, a detachable easel is provided for supporting a portable electronic device in a substantially upright position at a desired viewing angle when the easel is in an open position, and for stowing a wireless keyboard module onto a back surface of the portable electronic device when the easel is in a closed position. In one preferred embodiment, the detachable easel consists of a 3-bar linkage mechanism comprising a first link configured to provide a retaining frame for magnetically adhering to a back surface of the portable electronic device, a second link configured to provide a support frame for supporting the portable electronic device at a number of different viewing angles when the easel is in the open position, and a third link configured to provide a keyboard tray for stowing the wireless keyboard module onto the back surface of the portable electronic device when the easel is in a closed position.

14 Claims, 5 Drawing Sheets

(56) References Cited

U.S. PATENT DOCUMENTS 8,472,874 B2      6/2013   Tang et al.
9,277,659 B2 *   3/2016   Onda .................. H05K 5/0217

* cited by examiner

DETACHABLE EASEL WITH KEYBOARD TRAY AND WIRELESS PAIRING PROTOCOL

PRIORITY CLAIM

The present application claims priority to U.S. Provisional Application No. 61/969,616 filed Mar. 24, 2014.

BACKGROUND OF THE INVENTION

1. Field of the Invention

The present invention relates in general to the field of portable electronic devices and, more particularly, to a portable electronic device, detachable easel with keyboard tray, wireless keyboard and method for communicating a charging signal and a pairing code between a portable electronic device and a wireless keyboard upon establishing physical contact between the two.

2. Description of the Related Art

The following descriptions and examples are not admitted to be prior art by virtue of their inclusion within this section.

Tablet personal computers (PCs) have become increasingly more popular, as the trend for highly compact, highly powerful computing devices continues. The tablet PC (or simply "tablet") is a fully functional personal computer with a full operating system, which is capable of running familiar productivity applications (such as Microsoft's Office™ applications), and offers the same rich connectivity to the Internet that a desktop or notebook PC provides.

The tablet is designed to work well with all types of input devices, including keyboards, styluses, and even a user's finger. The tablet typically includes a resistive or capacitive-based touch screen for receiving input from a stylus or finger, and provides effective handwriting recognition software for recognizing such input as handwritten text. In many cases, a virtual keyboard or graphical user interface (GUI) may be displayed on the touch screen for receiving input from the user. For longer documents and other applications, however, a peripheral keyboard device may provide the most efficient means for data input.

Unfortunately, using a peripheral keyboard requires the tablet user to carry the keyboard while moving from place to place. The need to carry along the keyboard, however small or compact, reduces the advantages of using a tablet. If a peripheral keyboard is to be used with the tablet, the user also needs a practical way to view the tablet display screen while entering data with the keyboard. This typically involves the use a stand to support the tablet in the desired viewing angle. Therefore, not only is the user required to carry a separate keyboard, but also a separate stand for supporting the tablet screen while the user's hands engage the keyboard. Accordingly, a need exists for an efficient way to permit a tablet user to input data into the tablet via a keyboard, without the need to carry a separate keyboard and a separate stand along with the tablet.

There are many different types of wired and wireless keyboards known in the art for use with portable electronic devices. Wireless keyboards have become increasingly popular, as their cord-free status provides more freedom of movement and cleaner workspaces. In most cases, wireless keyboards may connect with host devices (e.g. personal computers, portable electronic devices and workstations) via a wireless communication technology, such as optical or radio frequency (RF). RF technology allows wireless communications between peripheral devices and host devices without requiring alignment of the devices or a path free of obstructions between the devices. There are several RF communication protocols known in the art, including Bluetooth, Wi-Fi, and Ultra-Wideband (UWB) to name just a few.

A pairing protocol is used to establish a wireless communication channel between a wireless keyboard (or another wireless peripheral device) and a host device (e.g., a tablet PC). The wireless keyboard may be "paired" with a host device by entering a PIN into both devices, or by broadcasting a shared key. Once the devices are successfully paired, they can communicate with each other over the wireless communication channel. However, in some environments having a large pool of wireless keyboards and tablets, it is easy for the wireless keyboards and tablets to become mismatched. When this occurs, it is often necessary to repeat the pairing process to reestablish wireless communication between the two devices.

Security is important for those using peripheral devices to enter sensitive data into a host system, such as passwords or account numbers. However, current RF communication protocols fail to provide a simple pairing protocol to establish a secure communication channel between peripheral and host devices, without requiring significant user interaction or a security key exchange over public airspace. Using the public airspace to broadcast a pairing request and to exchange security information is prone to various security breaches. For instance, an eavesdropper may try to intercept a radio transmission containing a security key.

In some cases, encryption may be used in order to protect sensitive information. Encryption is the process of encoding information in such a way that only the person (or computer) with the encryption key, a code that the devices use to encrypt or decrypt a packet of information that is transmitted to or from a device, can decipher the information. The use of encryption to facilitate secure communication between a wireless peripheral device and a host device requires both devices to be equipped with the same encryption key. A private key, or symmetric key, is an encryption/decryption key known only to the party or parties that exchange encrypted communications. Generally, systems that currently employ private key encryption technology require the person pairing the devices to manually pass the encryption key from one device to the other. This requires the user to interact with the software on the host device and typically involves a number of manual steps, such as inputting the key manually. A need, therefore, exists for an improved method for simplifying and securing the connection and pairing process between a wireless keyboard and a tablet.

SUMMARY OF THE INVENTION

The present invention overcomes the limitations of the prior art by providing a portable electronic device (e.g., a tablet PC), a detachable easel with a keyboard tray, a wireless keyboard module and a method for charging and automatically pairing a wireless keyboard with a portable electronic device upon establishing physical contact between the two. The following description of various embodiments of the invention is not to be construed in any way as limiting the subject matter of the appended claims.

According to one embodiment, a detachable easel is provided for supporting a portable electronic device in a substantially upright position at a desired viewing angle when the easel is in an open position, and for stowing a wireless keyboard module onto a back surface of the portable electronic device when the easel is in a closed position. In one preferred embodiment, the detachable easel consists of a 3-bar linkage mechanism comprising a first link, a second link having a distal end connected to a first distal end of the first link via a first pair of axial hinges, and a third link having a distal end connected to a second distal end of the first link via a second pair of axial hinges (i.e., the first link is coupled between the second and third links via axial hinges located at the distal ends of the first link).

The first link is configured to provide a retaining frame for magnetically adhering to and supporting a back surface of the portable electronic device. For example, the first link may comprise one or more magnetic structures for aligning with and magnetically adhering to corresponding magnetic structures located on the back surface of the portable electronic device.

The second link is configured to provide a support frame for supporting the portable electronic device at a number of different viewing angles when the easel is in the open position. In one preferred embodiment, the second link comprises a pair of slots, wherein each slot is configured for receiving and guiding a peg (connected to the third link) to a location along the slot that supports the portable electronic device in a substantially upright position at a desired viewing angle. In some embodiments, the pair of slots may each have notches for providing a finite number of viewing angles. In other embodiments, the pair of slots may be configured to provide a substantially infinite number of viewing angles within a range of motion. In other embodiments, the pair of slots may be configured for providing one fixed viewing angle. In some embodiments, the second link may comprise one or more magnetic structures to provide a latching force, which helps to retain the detachable easel in the closed position.

The third link is configured to provide a keyboard tray for stowing the wireless keyboard module onto the back surface of the portable electronic device when the easel is in a closed position. When the easel is opened, the third link presents the wireless keyboard module to the user in a way that enables the user to grasp and extract the module in an ergonomic manner. According to one embodiment, the third link may be selectively positioned at an angle with respect to the first link over a predefined range of motion. For example, the angle may selected from a group consisting of about 0° to about 45°, or more preferably, from a group consisting of about 0° to about 25°. According to another embodiment, the third link may be positioned at a fixed angle with respect to the first link when the detachable easel is in the open position.

According to one embodiment, the first link may comprise two substantially vertical members, each coupled at one end to a different one of the first pair of axial hinges and coupled at another end to a substantially horizontal member of the first link. The two substantially vertical members of the first link may comprise one or more magnetic structures, which are configured for aligning with and magnetically adhering to corresponding magnetic structures on the back surface of the portable electronic device.

The second link may also comprise two substantially vertical members, each coupled at one end to a different one of the first pair of axial hinges and coupled at another end to a substantially horizontal member of the second link. The substantially horizontal member of the second link may be configured for resting upon a support surface when the detachable easel is in the open position. When the detachable easel is in the closed position, the two substantially vertical members of the second link may be configured to align with and receive the two substantially vertical members of the first link. In some cases, the two substantially vertical members of the second link may comprise one or more magnetic structures for providing a latching force, which helps to retain the detachable easel in the closed position.

The third link is slidably connected to the second link for transitioning the detachable easel from the closed position to the open position and vice versa. According to on embodiment, a width of the third link may be less than a distance separating the two substantially vertical members of the second link, such that when transitioning the detachable easel from the closed position to the open position, the third link slides between the two substantially vertical members of the second link along a longitudinal axis of the two substantially vertical members.

According to one embodiment, a wireless keyboard module is provided for use with a portable electronic device. The wireless keyboard module described herein comprises a wired connector, which is configured to electrically connect to a wired connector on a back surface of the portable electronic device. Once connected, the wired connectors of the wireless keyboard module and the portable electronic device are advantageously configured to pass a charging signal and a pairing code there between. For example, the wireless keyboard module may include a battery and a charging circuit, which is coupled for charging the battery upon receiving the charging signal from the portable electronic device via the wired connectors. The wireless keyboard module may further include a microcontroller configured to automatically initiate and run a pairing subroutine once the wired connectors of the wireless keyboard module and the portable electronic device are connected. The pairing subroutine may cause a pairing code to be passed from the wireless keyboard module to the portable electronic device via the wired connectors. The pairing subroutine may generate a different pairing code every time the wired connectors are connected.

In some embodiments, the wireless keyboard module may further include one or more thermal intake vents that allow air to pass through the keyboard module into the portable electronic device when the keyboard module is mounted onto the back surface of the portable electronic device. The thermal intake vent(s) enable the portable electronic device to more effectively control its internal and external temperatures. The thermal intake vent(s) may be placed substantially anywhere around the periphery of the keyboard, but are preferably placed near corresponding air vents located on the back surface of the portable electronic device. If the air vents are not co-located, the spaces between keys may provide sufficient air flow channels for passing air to/from the portable electronic device.

According to another embodiment, a portable electronic device is provided herein and configured to communicate with a wireless keyboard module. The portable electronic device described herein comprises a wired connector, which is configured to electrically connect to a wired connector of the wireless keyboard module when the wireless keyboard module is retained on a back surface of the portable electronic device.

In one preferred embodiment, the wireless keyboard module may be retained on the back surface of the portable electronic device through the use of a detachable easel, as described herein. In such an embodiment, one or more magnetic structures may be arranged on the back surface of the portable electronic device for aligning with and magnetically adhering to corresponding magnetic structures on the detachable easel. In addition to retaining the wireless keyboard module on the back surface of the portable electronic device, the magnetic structures on the portable electronic device and the detachable easel may help with the alignment and connection of the wired connector of the wireless keyboard module to the wired connector on the portable electronic device when the easel is closed.

When physically and electrically connected, the wired connectors of the wireless keyboard module and the portable electronic device are configured to pass a charging signal and a pairing code there between. For example, the portable electronic device may include interface circuitry for receiving a keyboard docked signal when the wired connectors of the wireless keyboard module and the portable electronic device are connected, and in response to the keyboard docked signal, supplying a charging signal to the wireless keyboard module via the wired connectors. The charging signal may be used to charge a battery included within the wireless keyboard module, as described herein. The portable electronic device may also include firmware for receiving a pairing code from the wireless keyboard module via the wired connectors. If pairing is successful, the portable electronic device may communicate with the wireless keyboard module via RF circuitry and antennas when the wired connectors of the wireless keyboard module and the portable electronic device are disconnected.

According to another embodiment, a method is provided herein for charging a wireless keyboard module and pairing the wireless keyboard module to a portable electronic device. In general, the method may begin by physically and electrically connecting a wired connector of the wireless keyboard module to a wired connector located on a back surface of the portable electronic device. Once the wired connectors are connected, a charging signal may be passed from the portable electronic device to the wireless keyboard module via the wired connectors. A pairing code may also be passed from the wireless keyboard module to the portable electronic device via the wired connectors when connected.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 1:
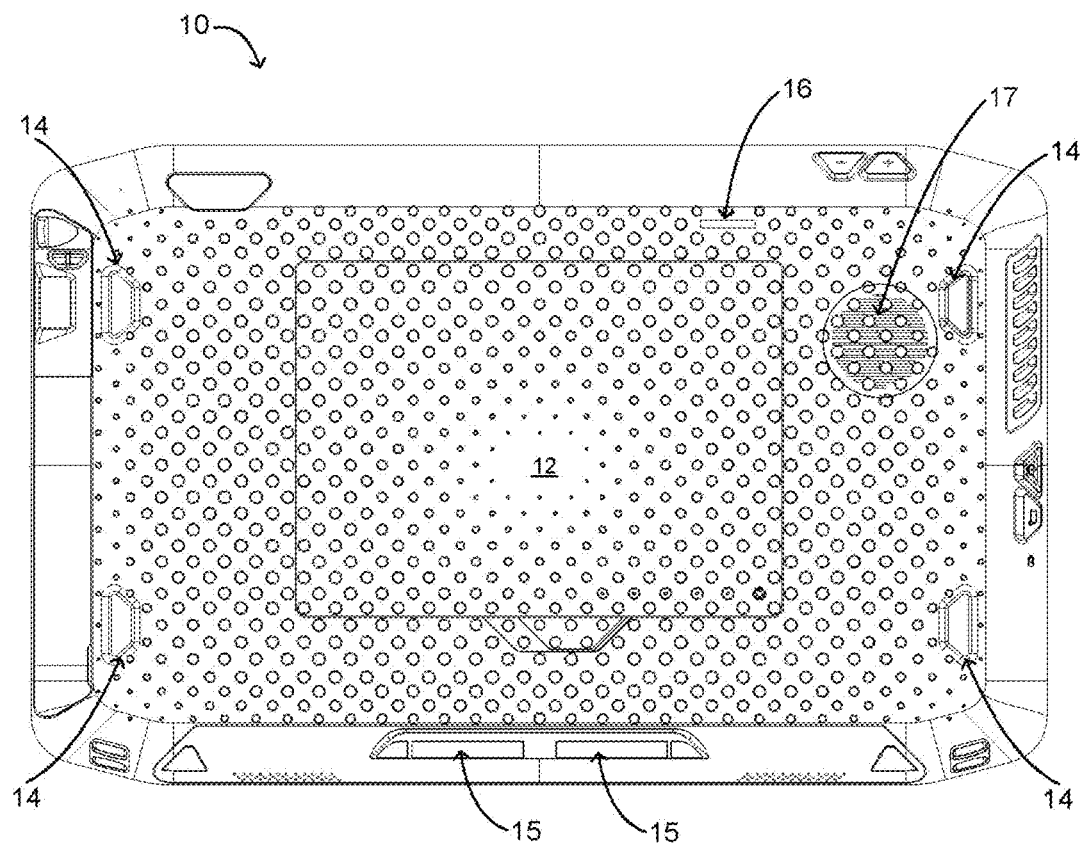
FIG. 1 is a back-side view of a portable electronic device (e.g., a table PC), according to one embodiment.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

According to one embodiment, the present invention is directed to a portable electronic device and a detachable easel, which can store a wireless keyboard module on the backside surface of the portable electronic device when the keyboard is not in use, and support the portable electronic device in an upright manner, so that the device display screen is ergonomically angled towards the user. The present invention is particularly well suited to tablet PCs, but could be used with other portable electronic devices that have touch sensitive display screens, and would benefit from the use of a wireless keyboard device. As the touch sensitive display screen (or simply "touch screen") is often the primary means of data input in such devices, it would be desirable to seamlessly integrate the wireless keyboard module with the tablet when not in use. FIGS. 1-6 illustrate one preferred embodiment of a portable electronic device and a detachable easel with a seamlessly integrated wireless keyboard module.

Figure 2:
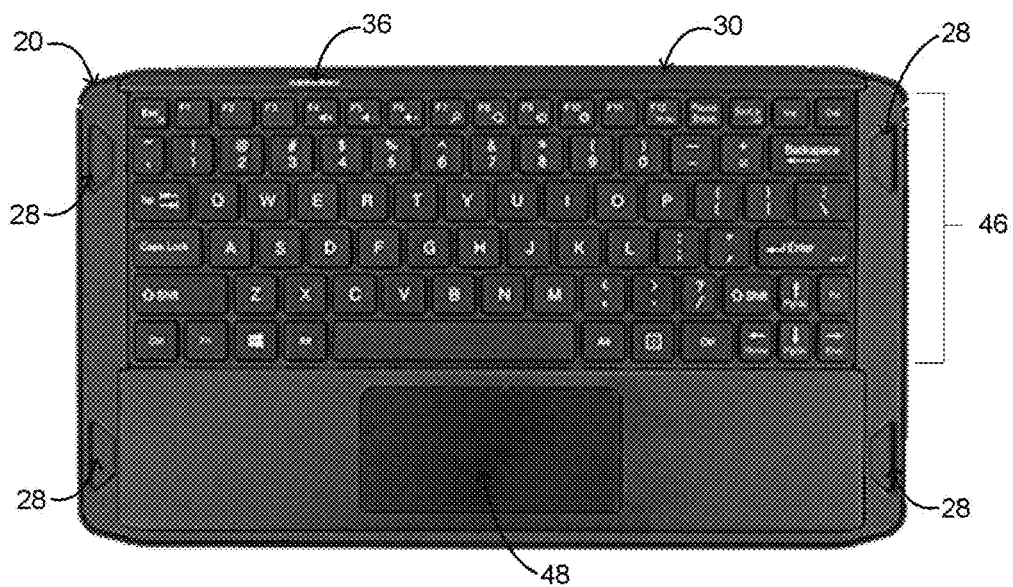
FIG. 2 is a front-side view of a detachable easel with stowed keyboard module in a closed position.

FIG. 1 is a back-side view of a portable electronic device 10 and FIG. 2 is a front-side view of a detachable easel 20 with a stowed keyboard module 30 in the closed position. In particular, FIG. 1 illustrates a back surface 12 of the portable electronic device 10 having magnetic structures 14 configured for aligning and magnetically connecting to magnetic structures 28 on the front surface of the detachable easel 20 shown in FIG. 2. As used herein, a "magnetic structure" is a structure that either generates a magnetic field, or is susceptible to a magnetic field. For example, a magnetic structure may be a raised or embedded magnet, a metal foot or protrusion, or a metal-lined cavity.

Any combination of magnet structures 14/28 may be used on the back surface of the portable electronic device 10 and on the front surface of the detachable easel 20. For example, two of the magnetic structures 14 on the back surface 12 of the portable electronic device 10 may be implemented with metal feet, while the other two are implemented with raised magnets. Alternatively, an all-magnet or all-metal feet embodiment is envisioned for the back surface 12 of the portable electronic device 10. The purpose of the magnetic structures 14 is to align with and magnetically connect to corresponding magnetic structures 28 (e.g., metallic cavities or embedded magnets) positioned on the front surface of the detachable easel 20. The strength of the magnetic bond may generally depend on the number and size of magnets used on the portable electronic device 10 and/or the detachable easel 20, and should be chosen to provide a secure means for adhering the easel to the back of the portable electronic device.

Figure 3:
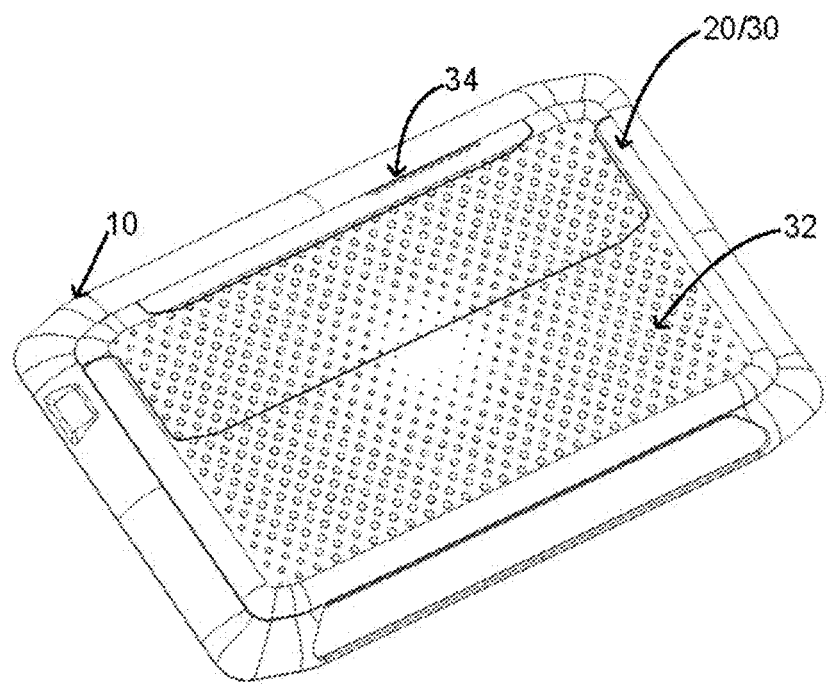
FIG. 3 is a back-side view of the detachable easel and stowed keyboard module shown in FIG. 2 mounted onto the back surface of the portable electronic device shown in FIG. 1.
Figure 4:
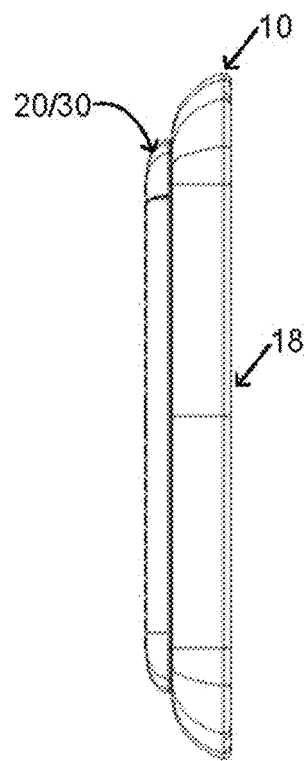
FIG. 4 is a side view of the portable electronic device and detachable easel with keyboard module shown in FIG. 3.

FIGS. 1-2 illustrate the detachable easel 20 and keyboard module 30 separated from the portable electronic device 10. FIGS. 3-4 illustrate the detachable easel 20 and keyboard module 30 magnetically stowed onto the back surface 12 of the portable electronic device. As shown in FIGS. 3-4, the detachable easel 20 and keyboard module 30 seamlessly integrate with each other and with the portable electronic device 10 when the keyboard is not in use. Such seamless integration enables the user to interact with the touch screen 18 (FIG. 4) of the portable electronic device 10, and provides secure keyboard storage when the keyboard is not in use, while giving the appearance of a single monolithic device. In some embodiments, the detachable easel 20 and/or the keyboard module 30 may be implemented with a non-slip back-side surface 32 to provide better grip and a more stable horizontal support surface.

As shown in the embodiment of FIG. 2 (and later in FIG. 8), keyboard module 30 may generally comprise a QWERTY keyboard 46 and a touch pad (TP) 48 for accepting user input. Although the touch pad 48 is positioned below the keyboard 46 in FIG. 2, alternative arrangements may be used without departing from the scope of the invention. In some cases, other means for accepting user input may be used in addition to, or in place of, touch pad 48.

Keyboard module 30 is a wireless keyboard module that is generally configured to connect with one or more host devices (e.g. personal computers, portable electronic devices, workstations, etc.) via a wireless communication technology, such as an optical or radio frequency (RF) technology. In many cases, RF communication may be preferred, as it allows wireless communications between peripheral devices and host devices without requiring alignment of the devices or a path free of obstructions between the devices. There are several RF communication protocols known in the art, including Bluetooth, Wi-Fi, and Ultra-Wideband (UWB), with which the wireless keyboard module 30 may use to communicate with a host device. However, wireless keyboard module 30 is not strictly limited to RF communication protocols, and may alternatively use any other wireless communication technology known in the art.

Wireless keyboard module 30 provides numerous advantages over conventional wireless keyboard designs. As shown in FIG. 3, for example, the wireless keyboard module 30 includes at least one thermal intake vent 34 on the back-side of the module that allows air to pass through the keyboard into the portable electronic device 10. The thermal intake vent(s) 34 enable the portable electronic device 10 to more effectively control its internal and external temperatures. Although illustrated on the top of the keyboard module, the thermal intake vent(s) 34 may be placed substantially anywhere around the periphery of the keyboard, preferably near corresponding air vents (e.g., air vent 17, FIG. 1) located on the back surface 12 of the portable electronic device 10. If the air vents 34/17 are not co-located, the spaces between keys on keyboard module 30 may provide sufficient air flow channels for passing air to/from the portable electronic device 10.

As another unique feature, a wired connector 36 is provided on the front surface (see, FIG. 2) of the wireless keyboard module 30 for aligning with and connecting to a corresponding wired connector 16 on the back surface 12 of the portable electronic device 10 (see, FIG. 1) when the wireless keyboard module 30 is properly stowed in the detachable easel 20 and magnetically connected to the portable electronic device (see, FIGS. 3-4). The magnetic structures 14 on the back surface 12 of the portable electronic device and the corresponding magnetic structures 28 on the front surface of the detachable easel 20 may assist in the alignment of the wired connectors 36 and 16. In one embodiment, the wired connectors 36/16 may be water-resistant, blind mating pogo pin connectors, although other types of connectors, such as pinless connectors, may be used. As described in more detail below, wired connectors 36/16 are preferably configured to pass both digital pairing codes and charging voltages between the portable electronic device 10 and the wireless keyboard module 30 when the keyboard module is magnetically stowed on the back surface 12 of the portable electronic device 10. A keyboard module 30 that can be charged by a portable electronic device 10, and automatically paired with the portable electronic device upon contact, represent further advantages over conventional wireless keyboard designs.

When a user wishes to place the portable electronic device 10 in the upright position, it is desirable to support the device 10 in an ergonomic position that enables the user to use the touch screen 18 and view the screen at a desirable viewing angle. There are many different types of stands and supports currently on the market for this purpose. For example, some conventional portable electronic devices come equipped with an integrated kickstand or easel that pops out of the rear of the device to support the device in a display mode. Although a wireless keyboard can be used with these devices, they provide no means for seamlessly and securely stowing the keyboard on the device. Other examples include keyboard docking stations and electronic device covers with integrated keyboards, which are sold as accessories to portable electronic devices. These either use a kickstand like mechanism, or simply an angled docking receptor, to support the portable electronic device at a fixed viewing angle. These designs also fail to provide means for seamlessly and securely stowing a keyboard on the back of the portable electronic device.

The detachable easel 20 shown in FIGS. 1-6 improves upon conventional stands, supports and covers in a variety of ways. As noted above, the detachable easel 20 provides means for seamlessly and securely stowing a keyboard on the back surface 12 of the portable electronic device 10, while providing the look and feel of a single piece of equipment. The magnetic structures 14 on the portable electronic device 10 and the corresponding magnetic structures 28 on the detachable easel 20 provide a strong magnetic bond that retains the detachable easel 20 on the back surface 12 of the device 10, and provides a latching force to keep the easel in the closed position until opened by the user. Additional advantages of the detachable easel 20 are described below.

Figure 5:
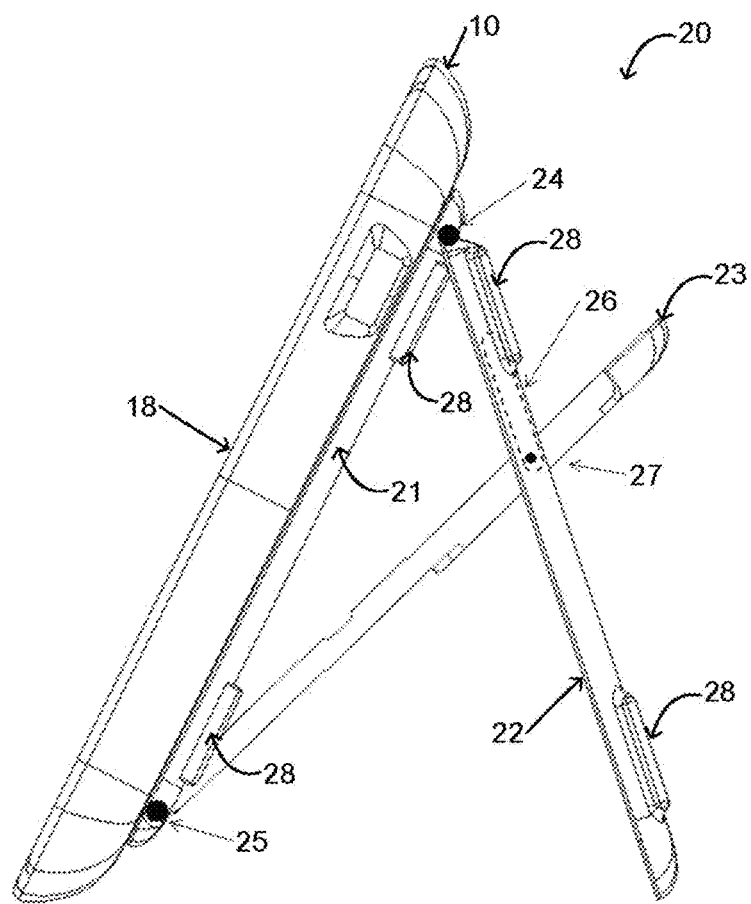
FIG. 5 is a side view of the portable electronic device with the detachable easel (without keyboard module) mounted to the back surface thereof and opened in a screen viewing angle.
Figure 6A:
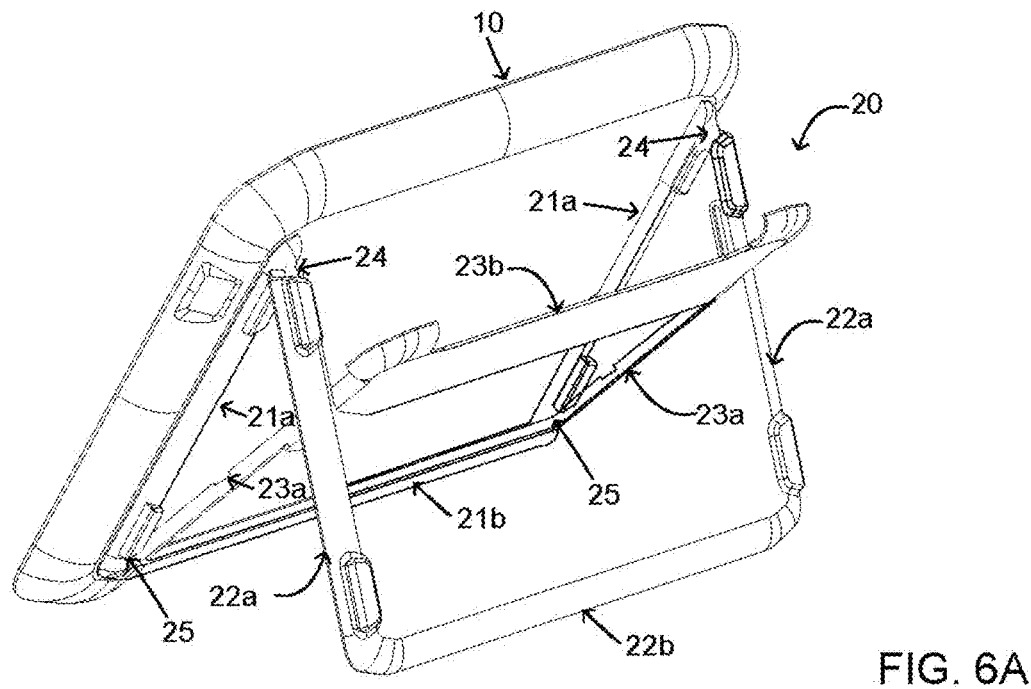
FIG. 6A is a back-side view of the portable electronic device and detachable easel shown in FIG. 5, according to one embodiment.
Figure 6B:
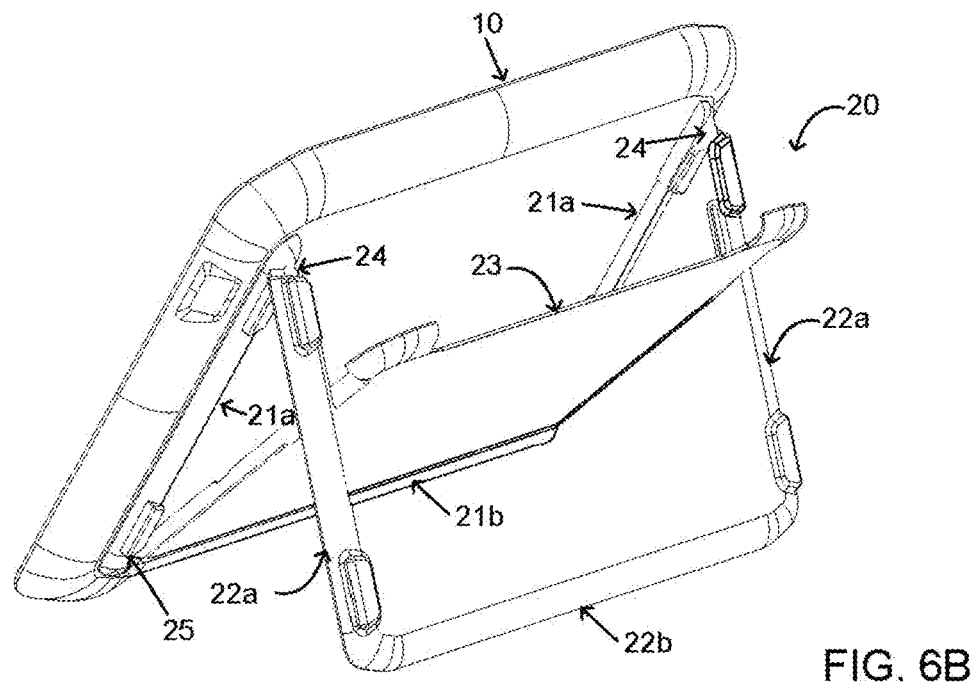
FIG. 6B is a back-side view of the portable electronic device and detachable easel shown in FIG. 5, according to another embodiment.
Figure 7:
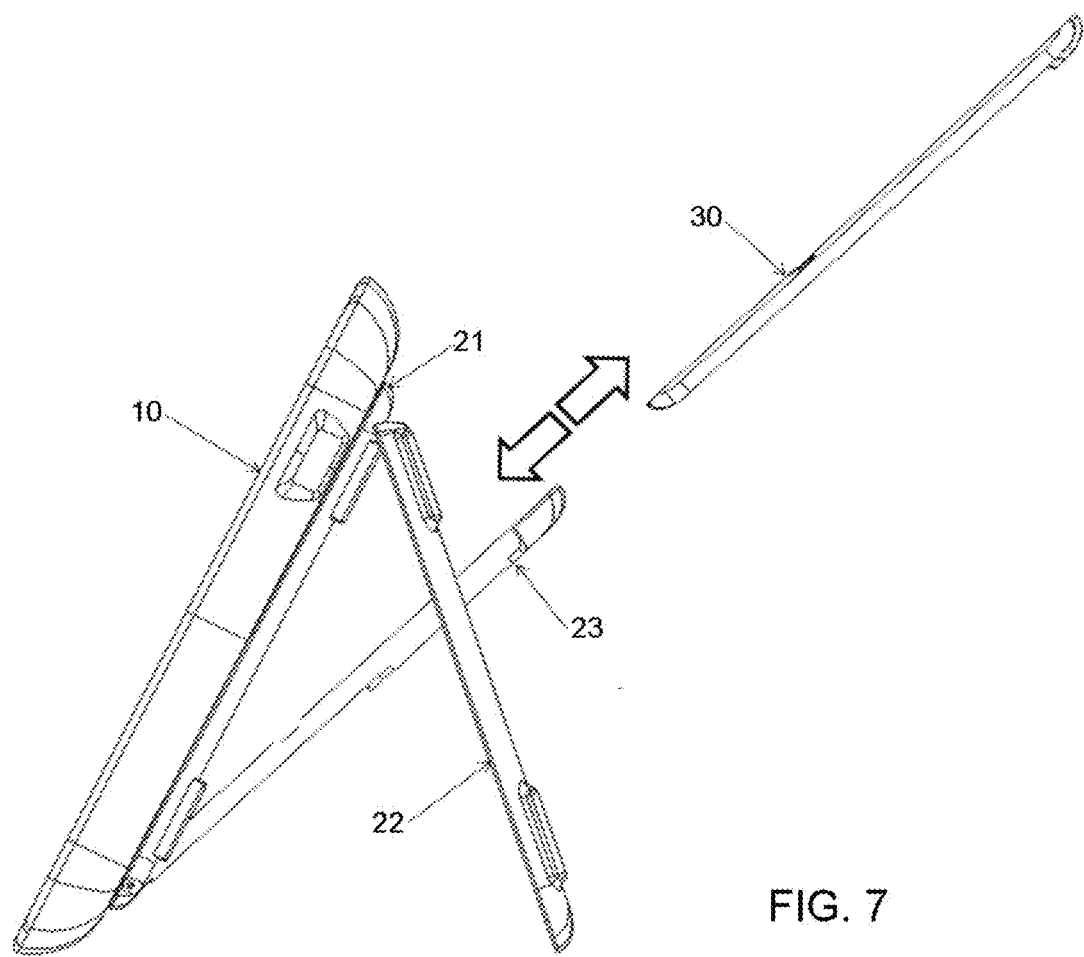
FIG. 7 is a side view of the portable electronic device and detachable easel, illustrating how the wireless keyboard module may be easily stowed in the keyboard tray portion of the easel, or removed therefrom, when the detachable easel is opened in the screen viewing angle.

FIGS. 5-7 show the detachable easel 20 mounted onto the back surface of the portable electronic device 10 and arranged in the open position. As shown in FIGS. 5-7, the detachable easel 20 is preferably implemented as a 3-bar linkage mechanism, wherein a first "link" provides a retaining frame 21 for magnetically adhering to and supporting the back surface 12 of the portable electronic device 10, a second "link" provides an support frame 22 for supporting the device 10 at a number of different viewing angles when the detachable easel is in an open position, and a third "link"

provides a keyboard tray 23 for stowing the wireless keyboard module 30. As described below, the 3-bar linkage mechanism enables the portable electronic device 10 to be supported in an ergonomic position that allows the user to use the touch screen 18 and view the screen at a number of different viewing angles.

As shown most clearly in FIG. 5, the retaining frame (first link) 21 includes a first pair of axial hinges 24 at a first distal end of the retaining frame for connecting to distal ends of the support frame (second link) 22 and providing rotational motion about the hinges. Another pair of axial hinges 25 is provided at the other distal end of the retaining frame 21 for connecting to distal ends of the keyboard tray (third link) 23 and providing rotational motion about the hinges. Rotation about hinges 24 and 25 enables the detachable easel 20 to be transitioned from the closed position shown in FIGS. 2-4 to the open position shown in FIGS. 5-7.

As shown most clearly in FIGS. 6A and 6B, the retaining frame (first link) 21 includes two substantially vertical members 21a, each coupled at one end to a different one of the first pair of axial hinges 24 and coupled at another end to a substantially horizontal member 21b of the retaining frame 21. The two substantially vertical members 21a of the retaining frame 21 preferably include one or more magnetic structures 28, which are configured for aligning with and magnetically adhering to corresponding magnetic structures 14 on the back surface 12 of the portable electronic device 10 (FIG. 1).

The support frame (second link) 22 also includes two substantially vertical members 22a, each coupled at one end to a different one of the first pair of axial hinges 24 and coupled at another end to a substantially horizontal member 22b of the support frame 22. The two substantially vertical members 22a of the support frame 22 are preferably configured to align with and receive the two substantially vertical members 21a of the retaining frame 21 when the detachable easel 20 is in the closed position (FIGS. 2-4). When the detachable easel 20 is in the open position (FIGS. 5-7), the substantially horizontal member 22b of the support frame 22 may rest on a support surface, such as a table or desk. In some embodiments, one or more magnetic structures 28 may also be placed on the two substantially vertical members 22a of the support frame 22 to provide a latching force, which helps retain the detachable easel 20 in the closed position. In some embodiments, it may be desirable to position the magnetic structures 28 included on the support frame 22 so that they align with the magnetic structures 28 and 14 included on the retaining frame 21 and on the back surface 12 of the portable electronic device 10, so that the same magnetic structures that secure the easel to the electronic device may also be used to provide a latching force to hold the easel in the closed position.

In the embodiment shown in FIG. 6A, the keyboard tray (third link) 23 includes two substantially vertical members 23a, each coupled at one end to a different one of the second pair of axial hinges 25. A shelf 23b is provided at the other end of the vertical members 23a for supporting a top portion of the keyboard module 30. Side portions of the keyboard module 30 may be supported by the vertical members 23a. In the embodiment shown in FIG. 6B, the keyboard tray (third link) 23 includes a continuous surface for supporting the keyboard module 30.

The keyboard tray (third link) 23 is slidably connected to the support frame (second link) 22 for transitioning the detachable easel 20 from the closed position (FIGS. 2-4) to the open position (FIGS. 5-7) and vice versa. In preferred embodiments, a width of the keyboard tray 23 is less than a distance separating the two substantially vertical members 22a of the support frame 22, such that when transitioning the detachable easel 20 from the closed position to the open position, the third link slides between the two substantially vertical members 22a of the support frame 22 along a longitudinal axis of the two substantially vertical members.

In the particular embodiment shown in FIG. 5, the keyboard tray 23 is slidably connected to the support frame 22 by providing the support frame 22 with a pair of slots 26 and providing the keyboard tray 23 with a pair of pegs 27. Each slot 26 is configured for receiving and guiding a corresponding peg 27 to a location along the slot that supports the portable electronic device 10 in a substantially upright position at a desired viewing angle. In some embodiments, the slots 26 may have notches for providing a finite number of viewing angles. In other embodiments, the slots 26 may be configured to provide an infinite number of viewing angles within its range of motion. In yet other embodiments, the slots 26 may only provide one fixed viewing angle when the easel is in the open position. Other means for slidably connecting the keyboard tray 23 to the support frame 22 may be used in other embodiments.

Together, the slots 26 and the second pair of axial hinges 25 allow the keyboard tray 23 to be selectively positioned at an angle with respect to the retaining frame 21. According to one embodiment, the angle may be selected from a group consisting of about 0° (in the closed position) to about 45° (in the fully opened position). According to another embodiment, the angle may be selected from a group consisting of about 0° (in the closed position) to about 25° (in the fully opened position). According to yet another embodiment, the angle may be a fixed angle, one example of which may be approximately 25°. The range of motion provided by the slots 26 and the second pair of axial hinges 25 preferably enables the detachable easel 20 to present the keyboard module 30 to the user in a way that enables the user to grasp and extract the keyboard module in an ergonomic manner when the easel is in the open position, as shown in FIG. 7. When the detachable easel 20 is closed, the detachable easel 20, keyboard module 30 and portable electronic device 10 appear substantially as one monolithic device.

When the detachable easel 20 is closed, the easel also retains and aligns the keyboard module 30 in a precise position that enables an electrical connection between the keyboard and the portable electronic device to exist. When the easel is opened to place the portable electronic device 10 in an upright position and/or to access the keyboard module 30, the electrical connection between the keyboard and the device is automatically disengaged. Further description of this is provided below.

Figure 8:
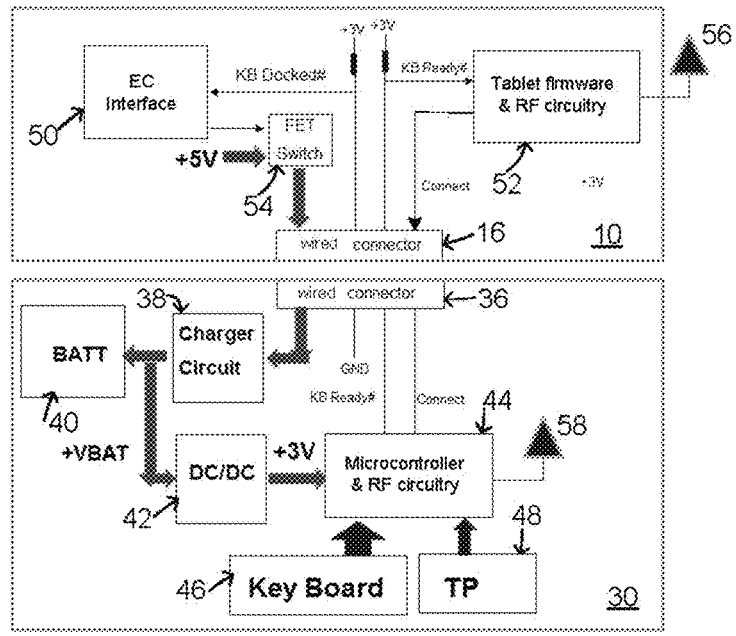
FIG. 8 is a block diagram of various circuitry within the portable electronic device (e.g., a table PC) and wireless keyboard module and the wired connectors that, once connected, pass a charging signal and a pairing code between the portable electronic device and the wireless keyboard module.
Figure 9:
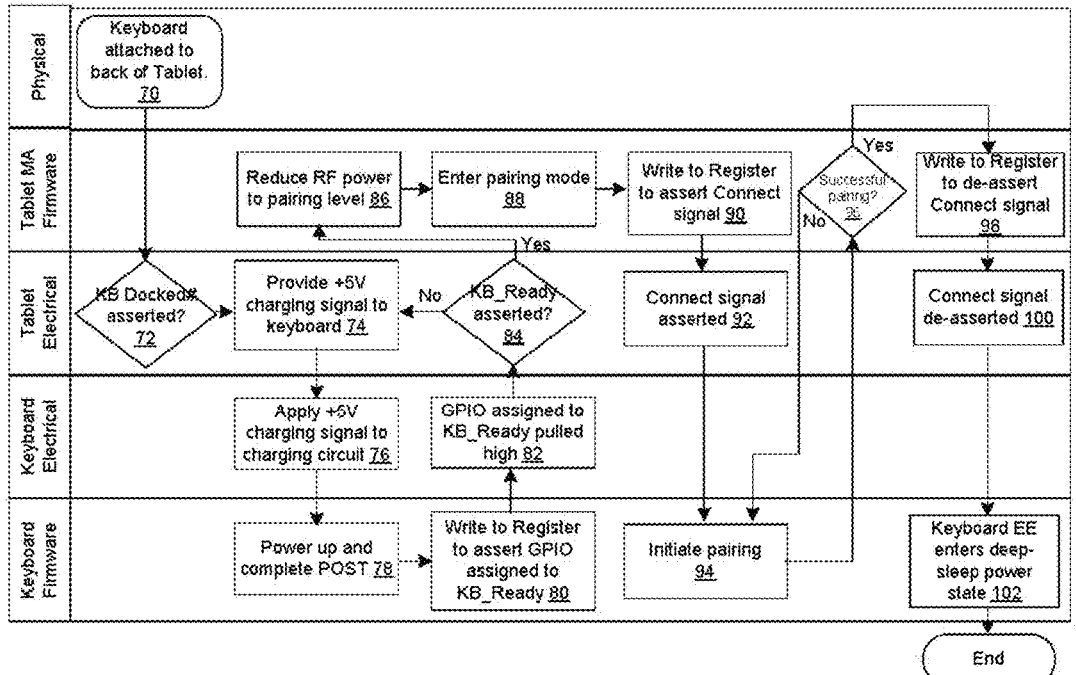
FIG. 9 is a flow chart diagram illustrating one embodiment of a method for charging and automatically pairing a wireless keyboard with a portable electronic device upon physically connecting a wired connector of the keyboard module to a wired connector of the portable electronic device.

FIGS. 8-9 illustrate examples of electrical signals that may be communicated between the portable electronic device 10 and the keyboard module 30 when properly stowed in the detachable easel 20 and magnetically connected to the back surface 12 of the portable electronic device. In particular, FIG. 8 is a block diagram of various circuitry that may be included within the portable electronic device 10 and the wireless keyboard module 30. FIG. 9 is a flow chart diagram illustrating how a charging signal may be supplied from the portable electronic device 10 to the keyboard module 30, and a pairing protocol may be initiated, upon physically connecting the wired connector 36 of the keyboard module 30 to the wired connectors 16 of the portable electronic device 10. FIGS. 8-9 are described below in the context of the preferred embodiment, in which a wireless keyboard module 30 is stowed on the back of a tablet 10. However, similar circuitry and methods may be used when stowing a wireless keyboard module onto other portable electronic devices.

According to one embodiment, a method for charging a wireless keyboard module 30 and pairing the wireless keyboard module to a tablet 10 may generally begin by physically and electrically connecting a wired connector 36 of the wireless keyboard module to a wired connector 16 located on a back surface 12 of the tablet. In some embodiments, a wireless keyboard module 30 may be retained on a back surface 12 of the tablet 10 by stowing the keyboard module within a keyboard tray 23 of a detachable easel 20, which is magnetically attached to the back surface of the tablet, as discussed above. As noted above, the detachable easel 20 may be generally configured to retain the wireless keyboard module 30 on the back surface of the tablet 10 when the detachable easel is in the closed position. The detachable easel 20 may also be configured to align and help engage a wired connector 36 on a front surface of the keyboard module 30 with a corresponding wired connector 16 on a back surface 12 of the tablet 10 when the detachable easel is in the closed position. Although such an easel is preferred, one skilled in the art would understand how a wireless keyboard module 30 may be charged and paired with a tablet 10 without the aid of such an easel. The detachable easel 20 is, therefore, preferred but not required to perform the method steps recited herein.

When the keyboard module 30 is retained on the back surface 12 of the tablet 10 (step 70, FIG. 9), a wired connector 36 of the keyboard module 30 is physically and electrically connected to a corresponding wired connector 16 of the tablet 10. The wired connectors 36/16 may comprise substantially any type of wired connectors, such as POGO pin connectors or pinless connectors, as discussed above. When a physical and electrical connection is made between wired connectors 36/16, a keyboard docked (KB Docked#) signal is asserted (step 72, FIG. 9) at wired connector 16 and supplied to the EC interface 50 of tablet 10, which in turn, causes a charging signal (e.g., a +5V signal) to be supplied to the keyboard module 30 (step 74, FIG. 9) via switch 54 and wired connectors 16/36. Once received, the charging signal is applied to a charging circuit 38 (step 76, FIG. 9) of the keyboard module 30, which uses the signal to charge a battery 40 and supply a DC voltage (+VBAT) to a DC/DC transformer 42. The DC/DC transformer 42 down converts the DC voltage to a lower voltage (e.g., +3V), which is used by the keyboard microcontroller and RF circuitry 44.

The ability to charge a wireless keyboard module 30 via a charging signal supplied from a portable electronic device (e.g., a tablet) 10 represents a distinct advantage over conventional designs, which require the user to carry around an AC adapter module and find an 110V outlet to charge the keyboard module. Although some embodiments of the invention may use an AC adapter module as an additional means to charge the keyboard, the ability to charge the keyboard through the tablet is an especially convenient option.

In addition to a charging signal, a pairing process is initiated to pair the wireless keyboard 30 with the tablet 10 upon connecting the wired connectors 36/16. For example, upon receiving the lower voltage (e.g., +3V) from the DC/DC transformer 42, the keyboard microcontroller 44 may power up and complete a power-on-self-test (POST) (step 78, FIG. 9), and write to a register to either assert or deassert a general purpose I/O (GPIO) pin assigned to a keyboard ready signal, KB_Ready# (steps 80 and 82, FIG. 9). If the KB_Ready# signal is not asserted by the keyboard microcontroller 44 (No branch of step 84, FIG. 9), the tablet may continue to provide the 5V charging signal to the keyboard (step 74, FIG. 9) until the keyboard is fully charged, or at least has enough battery power to function at a minimum threshold level. When the KB_Ready# is asserted by the keyboard microcontroller 44 (Yes branch of step 84, FIG. 9), the KB_Ready# signal is transmitted from the keyboard microcontroller 44 to the tablet firmware 52 via the GPIO pins of the wired connectors 36/16. Upon receiving an asserted KB_Ready# signal, the tablet firmware 52 reduces the RF power of the RF circuitry to a pairing level (step 86, FIG. 9) and enters a pairing mode (step 88, FIG. 9) by writing to a register to assert a Connect signal (steps 90 and 92, FIG. 9), which is then supplied to the keyboard module 30 via connectors 16/36.

Upon receiving the Connect signal, the keyboard microcontroller 44 initiates a pairing subroutine (step 94, FIG. 9) to share a digitally encrypted pairing code with the tablet firmware 52. The digitally encrypted pairing code is transmitted from the keyboard module 30 to the tablet 10 via the wired connectors 36/16, and thus, is very secure. Substantially any pairing protocol and encryption method may be used. In at least one preferred embodiment, the pairing code is changed every time the keyboard module is connected to the tablet to further increase security.

If the pairing process is unsuccessful (No branch of step 96, FIG. 9), the keyboard microcontroller 44 may reinitiate the pairing subroutine (step 94, FIG. 9) by resending a new digitally encrypted pairing code to the tablet firmware 52. In some embodiments, this process may be repeated a number of times (e.g., up to 4 times) until pairing is successful (in step 96, FIG. 9), or an error condition occurs. In some embodiments, a LED status light on the keyboard module 30 may signal to the user that pairing was unsuccessful. The LED status light may also indicate other status information to the user. For example, the LED status light may indicate to the user that the keyboard module 30 is in the process of pairing with the tablet 10, keyboard 46 is powering on/off, touch pad 48 is powering on/off, battery 40 level is less than 15%, battery 40 level is less than 5%, battery 40 is in the process of charging, and/or battery 40 is fully charged.

If the pairing process is successful (Yes branch of step 96, FIG. 9), the tablet firmware 52 writes to the register to de-assert the Connect signal (steps 98 and 100, FIG. 9), which in turn, places the keyboard micro-controller 44 into a deep-sleep power state (step 102, FIG. 9) until the user uses the keyboard 46 or the touch pad (TP) 48 to input data. When the wireless keyboard 30 is in use, data may be exchanged via the RF circuitry 44 and antenna 58 within keyboard module 30 and the RF circuitry 52 and antenna 56 within the tablet 56. Such data exchange may be conducted via any well-known RF communication protocol.

The primary advantage of the pairing process shown in FIGS. 8-9 is that a pairing protocol is automatically evoked upon stowing the keyboard module onto the back of the tablet and electrically connecting the wired connectors 36/16. This allows digital, encrypted pairing codes to be shared between the keyboard module and the tablet, and requires no user interaction other than the stowage of the keyboard module onto the tablet. Since a pairing code is exchanged between the keyboard module and tablet upon physical contact, the pairing process is significantly more secure than if the pairing codes were broadcast via the RF circuitry 44/52. This process also allows a user to mix and match a pool of tablets with a pool of keyboards without any concern, since one need only stow a keyboard module onto a tablet to pair the two devices.

It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A detachable easel for a portable electronic device, the detachable easel consisting of a 3-bar linkage mechanism, comprising:
    a first link configured to provide a retaining frame for adhering to and supporting a back surface of the portable electronic device;
    a second link having a distal end connected to a first distal end of the first link via a first pair of axial hinges, wherein the second link is configured to provide a support frame for supporting the portable electronic device at a number of different viewing angles when the detachable easel is in an open position; and
    a third link having a distal end connected to a second distal end of the first link via a second pair of axial hinges, wherein the third link is configured to provide a keyboard tray for stowing a wireless keyboard module.

2. The detachable easel as recited in claim 1, wherein the first link comprises one or more magnetic structures configured for aligning with and magnetically adhering to corresponding magnetic structures on the back surface of the portable electronic device.

3. The detachable easel as recited in claim 1, wherein the second link comprises one or more magnetic structures to provide a latching force, which retains the detachable easel in a closed position.

4. The detachable easel as recited in claim 1, wherein the third link is slidably connected to the second link for transitioning the detachable easel from a closed position to the open position and vice versa.

5. The detachable easel as recited in claim 1, wherein the second link comprises two substantially vertical members, each coupled at one end to a different one of the first pair of axial hinges and coupled at another end to a substantially horizontal member of the second link, which is configured for resting on a support surface when the detachable easel is in the open position.

6. The detachable easel as recited in claim 5, wherein a width of the third link is less than a distance separating the two substantially vertical members of the second link, such that when transitioning the detachable easel from the closed position to the open position, the third link slides between the two substantially vertical members of the second link along a longitudinal axis of the two substantially vertical members.

7. The detachable easel as recited in claim 5, wherein the first link comprises two substantially vertical members, each coupled at one end to a different one of the first pair of axial hinges and coupled at another end to a substantially horizontal member of the first link, and wherein the two substantially vertical members of the second link are configured to align with and receive the two substantially vertical members of the first link when the detachable easel is in the closed position.

8. The detachable easel as recited in claim 7, wherein the two substantially vertical members of the first link comprise one or more magnetic structures configured for aligning with and magnetically adhering to corresponding magnetic structures on the back surface of the portable electronic device, and wherein the two substantially vertical members of the second link comprise one or more magnetic structures configured for providing a latching force, which retains the detachable easel in the closed position.

9. The detachable easel as recited in claim 8, wherein the magnetic structures on the two substantially vertical members of the second link are aligned with and configured to receive corresponding magnetic structures on the two substantially vertical members of the first link.

10. The detachable easel as recited in claim 1, wherein the second link comprises a pair of slots, wherein each slot is configured for receiving and guiding a peg connected to the third link to a location along the slot that supports the portable electronic device in a substantially upright position at a desired viewing angle.

11. The detachable easel as recited in claim 10, wherein the pair of slots each have notches for providing a finite number of viewing angles.

12. The detachable easel as recited in claim 10, wherein the pair of slots is configured to provide an infinite number of viewing angles within a range of motion.

13. The detachable easel as recited in claim 10, wherein the second pair of axial hinges and the pair of slots allow the third link to be selectively positioned at an angle with respect to the first link, wherein the angle is selected from a group consisting of about 0° to about 45°.

14. The detachable easel as recited in claim 13, wherein the angle is selected from a group consisting of about 0° to about 25°.

* * * * *